Figure 1:
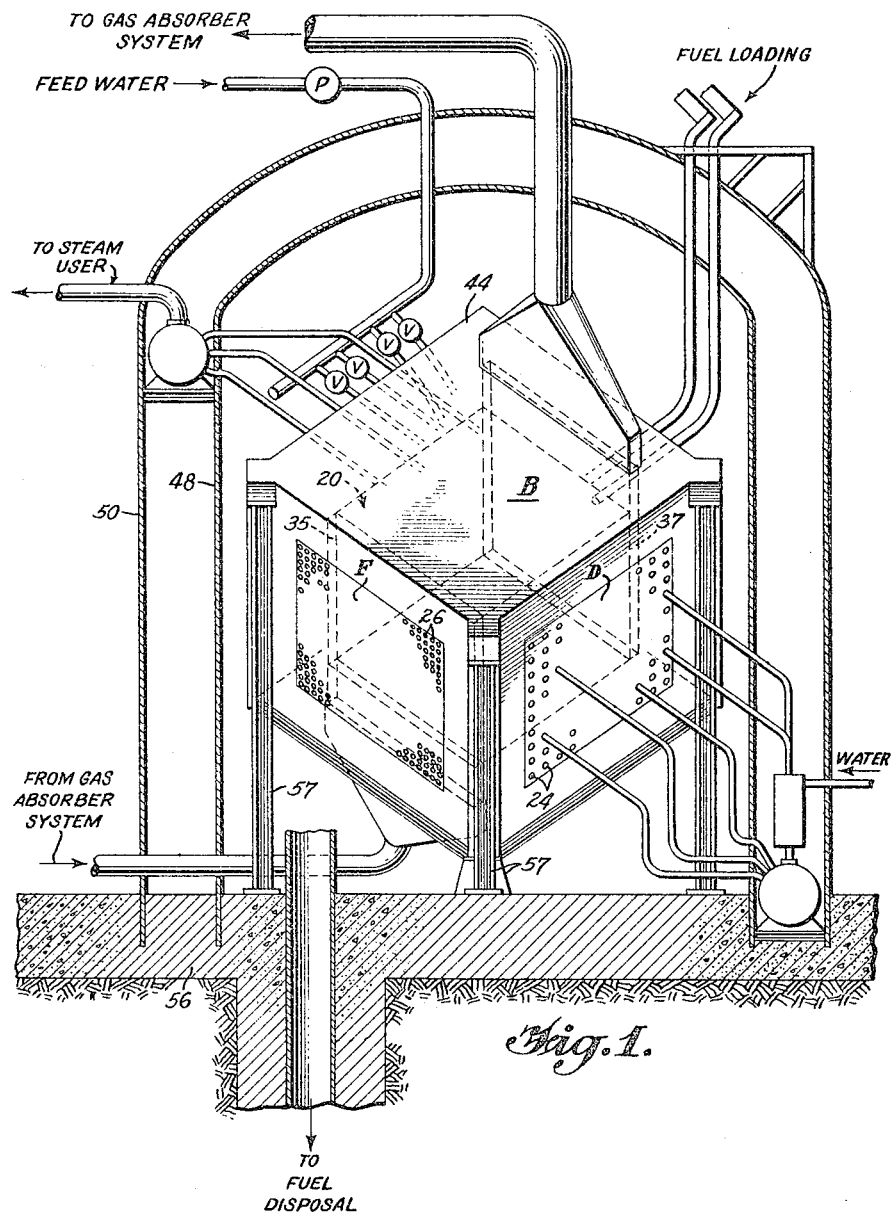

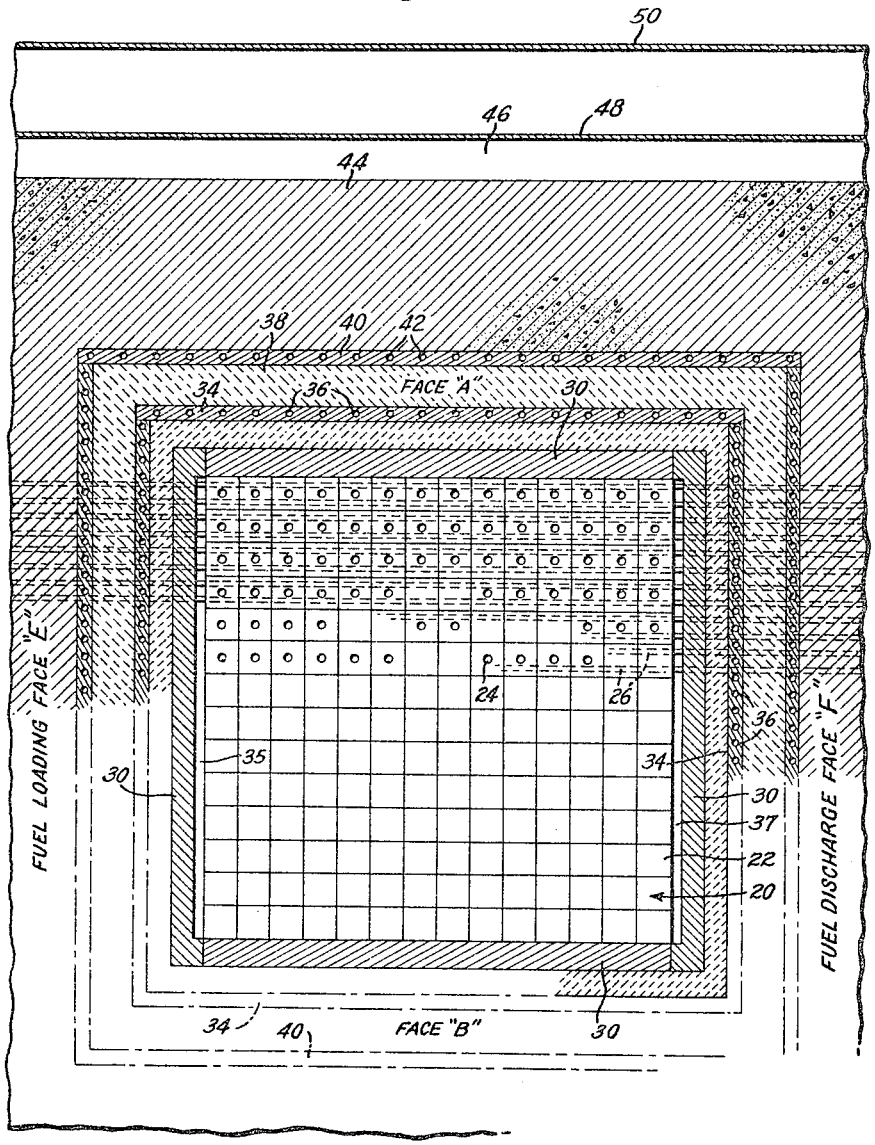

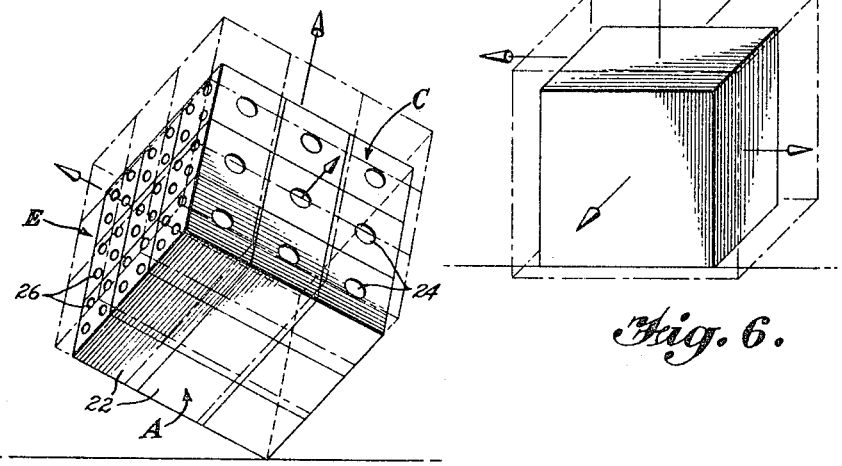
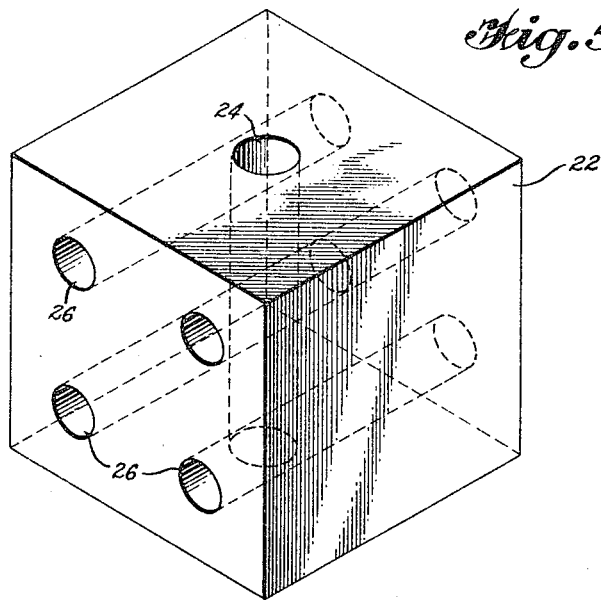

United States Patent Office 3,264,191
Patented August 2, 1966

3,264,191
REACTOR CORE AND SUPPORT THEREFOR
Morgan G. Huntington, Galesville, Md., assignor to RNB Corporation, Salt Lake City, Utah
Original application Nov. 14, 1963, Ser. No. 325,204, now Patent No. 3,210,253, dated Oct. 5, 1965. Divided and this application Aug. 20, 1964, Ser. No. 397,356
2 Claims. (Cl. 176—84)

This application is a division of my copending application Serial No. 325,204, filed November 14, 1963, now Patent No. 3,210,253 and which parent in turn is a continuation-in-part of my prior applications Serial No. 776,465, filed November 26, 1958, for Radiant Nuclear Boiler, and Serial No. 837,246, filed August 31, 1959, for Method of Operating and Controlling a Nuclear Reactor, both now abandoned.

This application relates to improvements in the art of nuclear reactors of the power generating type, and particularly to a reactor core and support therefor.

This invention concerns a graphite and light water moderated, light water cooled heterogeneous nuclear reactor for the generation of superheated steam. It is believed that the state of the art relative to heterogeneous graphite and light water dual moderated nuclear power reactors is sufficiently advanced that basic physics and specific calculations need not be included herein. Reference may be had to many issued patents and publications in the prior art on this subject.

It is present practice to construct a graphite moderator for a solid fuel reactor of a plurality of interlocked blocks. These blocks are assembled such that holes therein are aligned for inserting both fuel and coolant tubes. When the moderator assembly of a plurality of blocks is in operation and subjected to the heat generated therein, uncontrolled expansion will cause the two penetrations therethrough to weave or "snake" in sharp curves. One possible reason for this is because the moderator is supported on only one side and can expand in all other directions. It is an object of this invention to provide a graphite moderator constructed of a plurality of loose blocks stacked together having coolant and fuel penetrations therein, which moderator is supported on three sides thereof such that each set of penetrations is parallel to two of the three supporting sides. As the result of such support all penetrations will remain essentially smooth continuous curves both during expansion and contraction resulting from changes in temperature of the moderator. Because the slopes of the three restrained sides of the graphite prism are greater than 40°, which exceeds the angular repose of graphite-upon-graphite, the entire assembly may be tilted as much as 40° from its original vertical axis in any direction without disrupting the alignment of the penetrations through the graphite. Therefore the reactor assembly may be considered an earthquake-resistant structure.

Other objects and advantages of this invention will become apparent from the following detailed description and claims taken in connection with the accompanying drawings which disclose, by way of example, the principles of this invention and the best mode which has been contemplated for the application of these principles.

Figure 2:
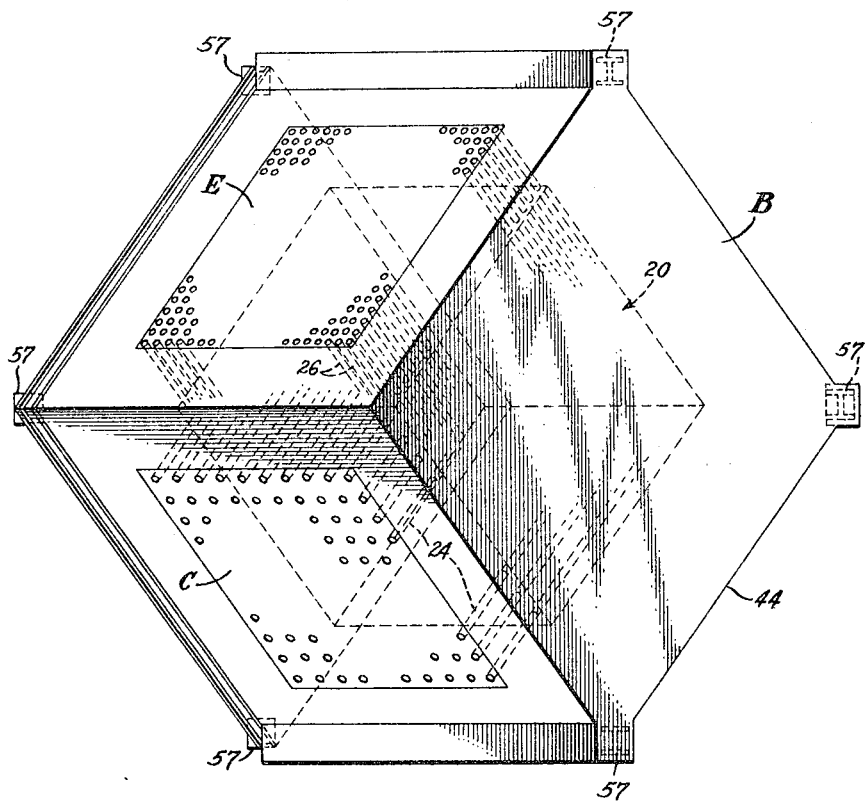
Figure 3:
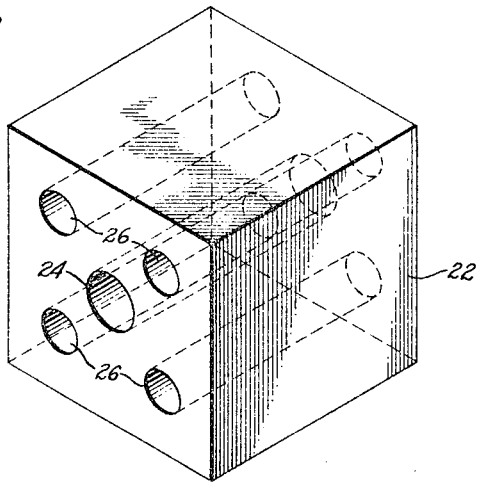
Figure 3A:
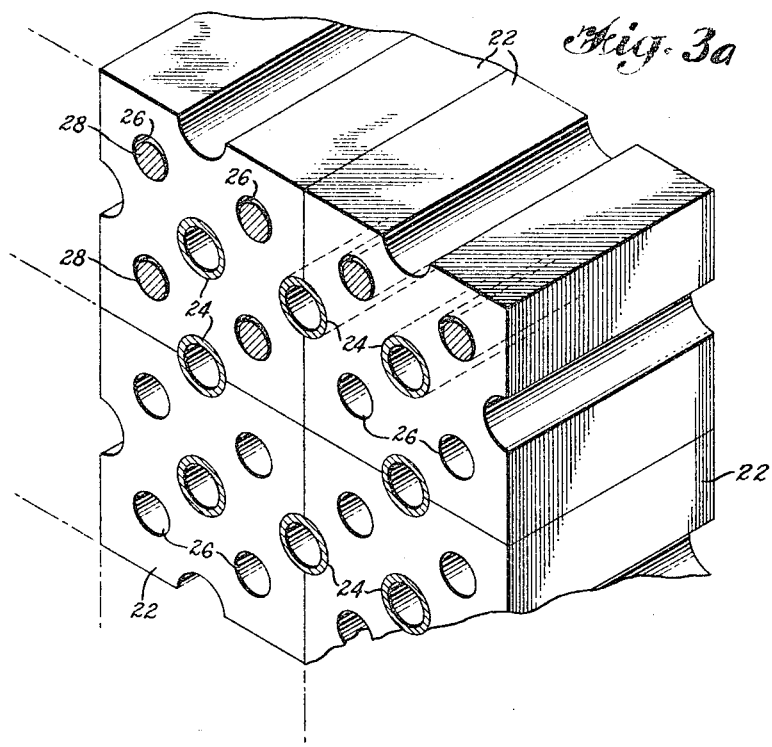

In the drawings:
FIGURE 1 is a schematic elevational view of the reactor assembly and enclosing housing of this invention;
FIGURE 2 is a top plan view of the reactor core and associated shielding showing fuel and coolant passages therethrough;
FIGURE 3 is a perspective view of an alternate form of moderator block wherein the fuel passages are parallel to the coolant passage;
FIGURE 3a is a perspective view of another modification of a moderator block wherein there is a coolant tube for each fuel penetration;
FIGURE 4 is a schematic sectional view taken through the reactor core and associated shielding;
FIGURE 5 is a perspective view of one form of a graphite moderator block utilized in this invention;
FIGURE 6 is a perspective view illustrating the expansion of a cube when supported on only one face; and
FIGURE 7 is a perspective view illustrating the expansion of a cube constructed of a plurality of moderator blocks supported or restrained on three faces.

In general, this invention contemplates a graphite-water moderated uranium reactor. The rector is firmly supported on three of its six sides and the restraint of the graphite is by gravity because the inclination of each face of each graphite block in the pile exceeds the angle of repose of graphite-on-graphite. The fuel element and coolant tube penetrations are each parallel to two of the fixed faces of the graphite so that the thermal distortion is minimized. Shrinkage cracks between the graphite cannot occur since the gravity restraint acts along all three fixed faces of the graphite pile. The reactor support of this invention is particularly useful with a reactor of the type described in my copending application Serial No. 325,204, filed November 14, 1963, but is not limited thereto. However, reference may be had to this application for further details of the reactor construction, operation, and system.

The reactor of this invention is basically a graphite-uranium pile undermoderated with respect to graphite (having moderation completed by light water) and normally operating at extremely high temperatures such that heat will be transferred to coolant tubes penetrating the graphite moderator.

Referring to the drawings, FIGURES 1, 2, 4 and 7, the graphite pile 20 is generally cube shaped or similar rectangular parallelopiped and is so constructed from a plurality of cube-shaped blocks 22. Each of the moderator blocks 22 has a coolant tube passage 24 as well as a plurality of fuel passages 26 therein. These passages may be through opposite faces of the cube as shown in FIGURE 5 or they may be parallel to the fuel passages, FIGURE 3. Also, in another embodiment of this invention using enriched fuel there may be one coolant tube penetration for each fuel penetration as shown in FIGURE 3a. A plurality of fuel elements 28, FIGURE 3a, may be inserted in the fuel passages 26 and these fuel elements are of such a nature that they may be operated as high as 6,600° F. without destruction of the fuel element matrix materials. A suitable fuel element which may be used is a nuclear material in an atmosphere of carbon monoxide or helium, and is contained in what are in effect crucibles of graphite, uranium carbide, thorium carbide, or thorium oxide in thorium oxide crucibles within graphite containers, or uranium carbide in depleted uranium carbide crucibles provide a thermally stable fuel element and permit such high operating temperatures, see Patent No. 3,028,330. Heat transfer is not such a serious critical problem at these high temperatures because transfer of heat by radiation is a function of the fourth power of the absolute temperature and the materials or spaces through which the heat is to be transferred when raised to such a high temperature cannot act as an insulator in the normal sense as in the case in conduction heat transfer.

It should be noted here that the only metal used in the reactor core is for the coolant tubes themselves since there is no metallic cladding on the fuel. Also there will be no samarium or xenon poisoning since fission products are continuously removed as described in detail hereinafter and therefore a very modest multiplication factor will be sufficient to operate the reactor. Further the critical array or reactor pile is not operated under substantial pressure thus eliminating a hazard of explosion and broadcast of radioactive materials.

The reactor shielding is best shown in FIGURES 1, 2 and 4. The reactor core 20 is constructed of a plurality of moderator blocks 22 having fuel passages 26 and coolant pasages 24 therein and is surrounded on four of its six faces by a graphite reflector 30. The other two faces are shielded by a layer (not shown) of carbon blocks containing boron carbide since continuous feeding of the fuel causes the fuel to penetrate either side of the graphite core. Surrounding the reactor core on all six sides is a primary thermal shield 34, separated from the carbon by at least 18 inches of refractory insulating brick 35. The primary thermal shield 34 is cooled by coolant flowing through passages 36 therein. The construction of this shield will be described in detail hereinafter. On the outside of the primary thermal shield 34 is a second refractory layer 38 approximately 18 inches thick. Outside the refractory layer 38 is a secondary thermal shield 40 also having coolant passages 42 therein. The construction of shield 40 is similar to the construction of shield 34. A biological shield 44 of concrete suitably weighted surrounds the outside of the reactor and is generally the same shape making a total over-all cube-shaped reactor and shielding construction. Outside the biological shield is an inert gas space 46, an inert gas shroud 48 and a containment shell 50, FIGURES 1 and 4.

The inert gas shroud 48 and the continuous shell 50 are suitably anchored in a heavy mass of concrete 56 such that no earthquake or the like could possibly destroy the reactor.

Gas passages 35 and 37 are provided at the edge of the reactor core 20 and are in fluid communication with the fuel passages 26 such that the fuel elements 28 may be swept with an inert gas to entrain the radioactive materials in vapor form which will subsequently be removed as described hereinafter.

In order to compensate for the thermal expansion which will occur at the extremely high temperatures involved within the reactor, the reactor is firmly supported on three of its six sides as shown in FIGURES 1 and 2. If a reactor is constructed of a plurality of blocks in the general shape of a block or cube as shown schematically in FIGURE 6 and is supported on one of these six faces of the block, upon expansion the block will expand in the direction of five of its six faces. If the block is made of a plurality of separate blocks, this expansion will cause any penetration or hole therein to assume a jagged curved pattern and this is detrimental to loading and unloading of fuel as well as to possible removal of the coolant tubes.

This invention solves this problem by supporting the reactor on three of its six faces such that the restraint of the graphite moderator blocks is by gravity because the attitude of each supported face exceeds the angle of repose of graphite on graphite. The moderator blocks are not interlocked in any way and they may freely slide relative to each other. Thus, they are restrained by gravity on three faces and may expand only in the directions of the other three faces. This restraint and expansion is shown schematically in FIGURE 7.

For convenience, the faces of the moderator pile will be designated A and B for the block faces, C and D for the coolant penetration faces, E for the fuel loading face, and F for the fuel discharge face. Thus, the fuel penetrations are through faces E and F and the coolant penetrations are through faces D and C. The restraint of two sides of the moderator is parallel to the penetrations, thus the fuel penetrations 26 are parallel to the restraining sides A and C and the expansion of the moderator blocks may be only in two directions transverse to the penetrations rather than in five separate directions as in the case of a conventionally supported pile illustrated schematically in FIGURE 6. In a similar manner, the coolant penetration through faces C and D are parallel to the restraining faces A and F of the cube and they may also expand only in the two directions transverse thereto. Hence, the penetrations for both coolant and fuel even after extreme expansion and contraction will assume only gradual continuous curves and will not "snake" as in the case of conventionally supported piles. Shrinkage cracks between the graphite blocks cannot occur since the graphite restraint acts along three fixed faces of the graphite pile.

It should be further noted that by so supporting and restraining the reactor assembly the entire reactor may be tilted as much as 40° in any direction without causing the individual graphite blocks to be dislocated by sliding one on the other. This manner of support and gravity restraint makes it possible for the loose aggregation of small graphite blocks to remain intact even in the event of extreme earthquake undulations of the earth's crust.

Suitable slab support members may be utilized to support the reactor core and its associated shielding on the three supported sides with a supported corner of the tube pointing downward. The drawing shows support members 57 in FIGURE 1, schematically illustrated for the sake of simplicity.

REACTOR STABILITY AND SAFETY

Since the reactor is designed to produce power for commercial purposes, it is possible that a reactor of this nature will be located near centers of population. If, due to any credible accident the reactor were to explode, the radioactive material would be scattered widely over the countryside and the results would be catastrophic. Therefore, power reactors of necessity must be constructed in such a manner that hazard factors are kept to a minimum. All possible hazards are minimized in the construction of the reactor described above. Certain of the known power reactors unnecessarily jeopardize lives and property of the surrounding communities and reactors should provide for minimum potential hazards to the citizenry. Therefore, in addition to its promise to reduce the cost of electric power to the present commercial levels the radiant nuclear boiler invention incorporates the following inherent safeguard:

The graphite core assembly of this reactor is gravity restrained and can withstand tilting of 40° in any direction without misalignment of penetrations. The reactor is not subject to destruction by severe earthquake shock and hence these reactors should be suitable for such areas as the Japanese islands.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A moderator structure for a water cooled nuclear reactor comprising: a plurality of graphite moderator blocks having sets of separate fuel passages and separate coolant passages therein, said moderator blocks being assembled in a block shaped pile such that said water and fuel passages are continuous therethrough, and means supporting three sides of said pile composed of said moderator blocks with one corner point of said block shaped pile intermediate the supported sides pointing downward, and in which two of the supported sides are parallel to one of said sets of passages.

2. A device as defined in claim 1 wherein the angle of inclination of each face of the moderator blocks exceeds the angle of repose of graphite-on-graphite thereby providing gravity restraint therefor.

No references cited.

LEON D. ROSDOL, *Primary Examiner.*

CARL D. QUARFORTH, *Examiner.*

R. L. GRUDZIECKI, *Assistant Examiner.*